Aug. 29, 1967           C. F. MOONEY           3,337,945
METHOD OF FORMING DIFFRACTION GRATING MASTERS
RULED IN TRANSFER FILMS
Filed June 30, 1965

PRIOR ART

CHARLES F. MOONEY
INVENTOR.

BY *Frank C. Parker*

ATTORNEY

United States Patent Office 3,337,945
Patented Aug. 29, 1967

3,337,945
METHOD OF FORMING DIFFRACTION GRATING MASTERS RULED IN TRANSFER FILMS
Charles F. Mooney, Irondequoit, N.Y., assignor to Bausch & Lomb Incorporated, Rochester, N.Y., a corporation of New York
Filed June 30, 1965, Ser. No. 468,195
5 Claims. (Cl. 29—423)

ABSTRACT OF THE DISCLOSURE

A method for producing a nearly ultimate flatness of an exposed metallic surface wherein a master grating is ruled, said surface being formed against high grade optically flat surface existing on a master plate.

Figure 1:
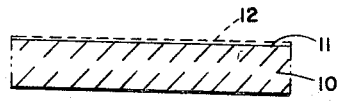

The present invention relates to a method of manufacture or formation of superior diffraction grating masters and more particularly relates to the formation of said grating in transfer films.

A transfer film of metal is defined herebelow and is illustrated by the various figures of this disclosure.

Ultraviolet monochromators and spectrographs frequently employ diffraction gratings in order to deliver spectrally dispersed light more efficiently than prisms or filters. The spectral purity of the dispersed light is mainly limited by scattered light of nearby spectrum regions which mixes with the spectral light that would have been concentrated in purer form if there had been no scattering.

The origin of much scattered light is the variation of groove contour detail from groove to groove. If all of the grooves were identical, spectra would be produced according to the elementary optical laws of interference wherein there exists no scattered light.

In practice, there is always some variability of groove form along with some amount of scattered light. The dominant origin of groove shape variability is the initial roughness of the surface into which grooves are ruled. The prior art practice of making ruled gratings is outlined herebelow and is shown schematically in FIG. 6 of the drawing. The steps are:

(1) Polish a glassy substrate material to have a prescribed shape and extreme smoothness.
(2) Condense a metal film, such as for instance aluminum or gold onto the polished substrate to a thickness greater than the depth of the grating grooves to be ruled.
(3) Burnish said grooves with a diamond tool into said metal film.

Because the metal film is thick and randomly deposited with arbitrary crystal growth formation, the exposed surface of the metal is never as smooth as the polished substrate surface on which it lies. The burnishing diamond helps to smooth the metal surface but still, the metal surface only approaches the smoothness of the finely polished optical substrate surface and therefore variability of groove shape occurs. The extent to which smooth burnishing can be achieved is much influenced by the smoothness of the exposed metal surface before burnishing.

It is an object of the present invention to provide a novel method of manufacture of a ruled diffraction grating having an extremely smooth exposed metallic surface, the layer of metal wherein the grating is ruled being thick enough to be burnished by a grating ruling diamond.

A further object is to provide such a method which produces an extremely smooth surface reliably, simply and at the least cost commensurate with the quality of the gratings sought.

Figure 2:
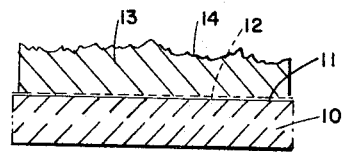
Figure 3:
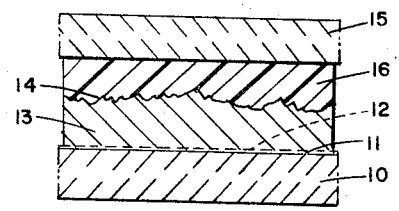
Figure 4:
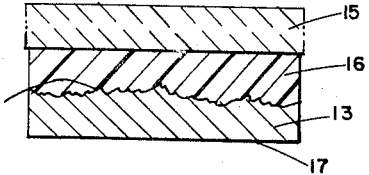
Figure 5:
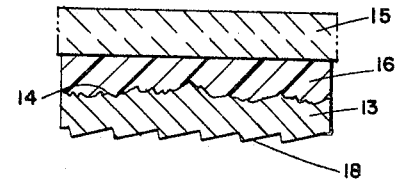

Further objects and advantages will be found in the details of the invention as described in the following specification and shown in the accompanying drawing, wherein:

FIG. 1 is a cross-sectional view of a glass substrate having a release film formed against a master optical surface thereon;
FIG. 2 is a cross-sectional view showing a metallic layer formed on said release film of FIG. 1;
FIG. 3 is a cross-sectional view similar to FIG. 2 showing additionally a backing plate cemented to said metallic layer;
FIG. 4 is a cross-sectional view similar to FIG. 3 except that the metallic layer is stripped off the master surface at the release layer;
FIG. 5 is similar to FIG. 4 except that the grating ruling has been formed in said metallic layer; and
FIG. 6 is a cross-sectional view representing the prior art.

Figure 6:

With reference to the prior art as shown in FIG. 6 and as described hereabove, it is easily apparent that regardless of how excellent the surface of the substrate whereon the metallic layer is formed, the metallic surface whereon the ruling is formed may depart considerably from true smoothness due to the causes mentioned. Such a disadvantage is inherent in the prior art method used and constitutes a bar to further improvement in the quality of grating produced.

According to the present invention, a novel sequence of operational steps is specified involving the use of a transfer film of metal to improve the quality of diffraction gratings particularly for use in the ultraviolet part of the spectrum as follows:

Step I.—On a glass substrate 10 as shown in FIG. 1, a polished master optical surface 11 of extreme flatness is formed by the best known manufacturing methods.

Step II.—On the master optical surface 11 is formed in any suitable manner, a very thin film or monolayer of release or separation compound which is shown at 12 in FIG. 1. For this film, a silicone wax polishing of the master surface 11 has been found to be successful. In any case, the film must be as thin as consistent with its use as a reliable separation agent which is interposed between the master optical surface and an overlying metallic layer.

Step III.—A film or layer of metal 13 as shown in FIG. 2 is deposited by a suitable vacuum process on the release film 12 whereby said metal layer is advantageously formed on an extremely flat surface in accordance with the objects of the present invention. The thickness of the metal layer 13 is generally greater than the depth of the grooves of the grating to be ruled therein and for practical reasons the layer 13 should have a thickness of substantially .1 micron to 10.0 microns thick.

In FIG. 2, the exposed surface 14 of the metal layer 13 is shown having an exaggerated roughness and unevenness as it would appear under great magnification using an electron microscope. Said roughness and unevenness of the exposed surface 14 is due predominantly to random deposition of the layer 13 with arbitrary crystal growth formation. As aforesaid, this condition causes variability of the groove shape from one groove to the next in the ruling. The material which has proven to be most successful for the metal layer 13 is high purity aluminum although other metals such as gold have produced good results at somewhat higher cost.

Step IV.—As shown in FIG. 3, a plane-parallel backing plate 15 is adhered to the metal layer 13 by a layer of cement 16, the preferred material for the backing plate being glass although other stable ceramic or metallic materials may be used.

The cement layer 16 should preferably be of a polymerizable type having a very low coefficient of contraction during polymerization or solidification. Two principal properties should characterize the cement as follows:

(1) It should withstand large local pressures without permanent deformation.

(2) It should have a low and generally linear elastic deformation.

For best results the cement layer 16 should be thin enough to reduce cushioning of the burnishing diamond during the ruling operation.

Step V.—The glass substrate 10 is separated from the layer of metal 13 at the release film 12 so as to transfer said layer onto the backing plate 15 as shown in FIG. 4. This step provides an extremely flat surface 17 on the metal layer 13.

Step VI.—In the flat surface 17 of the layer 13, parallel grooves 18 of a grating are burnished successively in a known manner as shown in FIG. 5 in exaggerated scale.

Since the true flatness of the grating surface 17 is such an influential factor in improving diffraction gratings, the above-described method inevitably results in a diffraction grating of supreme excellence with respect to scattering. Although the method described above includes only certain elements and operations by way of example, other elements may be incorporated along with some modification of the specific operations without departing from the spirit of the invention as defined in the claims appended herebelow.

I claim:

1. A method of forming a diffraction grating master in a transfer film, said method comprising the steps of
   providing a glass plate having a master polished optical surface formed thereon,
   forming on said surface an extremely thin film of release substance,
   depositing on said film a thick metallic layer,
   covering said layer with a thin coating of cement,
   adhering a glass backing plate onto said layer by means of said cement and allowing the cement to solidify,
   separating said master glass plate from said metallic layer to expose the optically flat surface formed thereon by the master optical surface of said glass plate, and
   burnishing a periodic groove structure of a diffraction grating into the metallic layer that has been formed against said master surface
   whereby near optimum smoothness of the grating and evenness and constancy of the periodic groove structure is achieved.

2. A method of forming a diffraction grating master as set forth in claim 1 further characterized by
   said release substance being a silicone wax which is applied by polishing said master surface with it.

3. A method of forming a diffraction grating master as set forth in claim 1 further characterized by
   said metallic layer being formed of high purity vacuum deposited aluminum.

4. A method of forming a diffraction grating master as set forth in claim 3 further characterized by
   said metallic layer being substantially between .1 and 10 microns thick.

5. A method of forming a diffraction grating master as set forth in claim 1 further characterized by
   said coating of cement having a very low coefficient of contraction during polymerization or solidification.

References Cited

UNITED STATES PATENTS

| | | | |
|---|---|---|---|
| 1,287,793 | 12/1918 | Tillyer et al. | 156—233 |
| 3,043,728 | 7/1962 | Stauffer | 156—231 |
| 3,249,467 | 5/1966 | Stookey | 29—424 X |
| 3,253,331 | 5/1966 | Limansky | 29—473.1 |

JOHN F. CAMPBELL, *Primary Examiner.*

THOMAS H. EAGER, *Assistant Examiner.*